(12) United States Patent
Wang et al.

(10) Patent No.: US 11,231,610 B2
(45) Date of Patent: Jan. 25, 2022

(54) DISPLAY PANEL AND DISPLAY APPARATUS

(71) Applicants: ORDOS YUANSHENG OPTOELECTRONICS CO., LTD., Inner Mongolia (CN); BOE Technology Group Co., Ltd., Beijing (CN)

(72) Inventors: Xiaokang Wang, Beijing (CN); Yanqing Chen, Beijing (CN); Jianyun Xie, Beijing (CN); Wei Li, Beijing (CN); Cheng Li, Beijing (CN); Le Sun, Beijing (CN); Wei Zhang, Beijing (CN); Xin Zhao, Beijing (CN); Zhijun Niu, Beijing (CN); Yezhou Fang, Beijing (CN); Pan Guo, Beijing (CN); Yanfeng Li, Beijing (CN); Weida Qin, Beijing (CN); Ning Wang, Beijing (CN)

(73) Assignees: ORDOS YUANSHENG OPTOELECTRONICS CO., LTD., Inner Mongolia (CN); BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 16/333,714

(22) PCT Filed: Jul. 19, 2018

(86) PCT No.: PCT/CN2018/096310
§ 371 (c)(1),
(2) Date: Mar. 15, 2019

(87) PCT Pub. No.: WO2019/114271
PCT Pub. Date: Jun. 20, 2019

(65) Prior Publication Data
US 2021/0325719 A1 Oct. 21, 2021

(30) Foreign Application Priority Data

Dec. 12, 2017 (CN) .......................... 201711313230.3
Dec. 14, 2017 (CN) .......................... 201711341677.1

(51) Int. Cl.
*G02F 1/1335* (2006.01)
*G02F 1/1362* (2006.01)

(52) U.S. Cl.
CPC .. *G02F 1/133512* (2013.01); *G02F 1/133514* (2013.01); *G02F 1/136209* (2013.01)

(58) Field of Classification Search
CPC ......... G02F 1/133512; G02F 1/133514; G02F 1/136209
See application file for complete search history.

(56) References Cited

U.S. PATENT DOCUMENTS

2010/0020277 A1 1/2010 Morita
2015/0286106 A1* 10/2015 Yang ................. G02F 1/136209
349/44
(Continued)

FOREIGN PATENT DOCUMENTS

CN 103686120 A 3/2014
CN 107092123 A 8/2017
(Continued)

OTHER PUBLICATIONS

International Search Report dated Oct. 18, 2018, issued in counterpart Application No. PCT/CN2018/096310 (11 pages).
(Continued)

*Primary Examiner* — Nathanael R Briggs
(74) *Attorney, Agent, or Firm* — Westerman, Hattori, Daniels & Adrian, LLP

(57) ABSTRACT

The present disclosure is related to a display panel. The display panel may include a first light shielding layer (101) in a display region and a second light shielding layer (212)

(Continued)

opposite the first light shielding layer (101) in the display region. The first light shielding layer (101) may include a plurality of first openings (112), and the second light shielding layer (212) may include a plurality of second openings (222). The display region may include a middle display region (20A) and a periphery display region (20B). An area of each of the plurality of the first openings (112) in the periphery display region (20B) may be smaller than an area of each of the plurality of the first openings (112) in the middle display region (20A).

19 Claims, 5 Drawing Sheets

(56) References Cited

U.S. PATENT DOCUMENTS

2016/0178940 A1  6/2016  Yuan et al.
2016/0274420 A1* 9/2016  Oh .................... G02F 1/136286
2017/0351148 A1* 12/2017 Yoshida ............ G02F 1/133753
2018/0335663 A1* 11/2018 Hirata ............... G02F 1/133512

FOREIGN PATENT DOCUMENTS

| CN | 107167957 A | 9/2017 |
| CN | 107357066 A | 11/2017 |
| CN | 107422516 A | 12/2017 |
| CN | 107861288 A | 3/2018 |
| KR | 20070015805 A | 2/2007 |

OTHER PUBLICATIONS

Office Action dated Jan. 19, 2020, issued in counterpart CN Application No. 201711341677.1, with English Translation. (17 pages).
Extended (Supplementary) European Search Report dated Oct. 6, 2021, issued in counterpart EP application No. 18859964.1. (7 pages).

* cited by examiner

DISPLAY PANEL AND DISPLAY APPARATUS

CROSS-REFERENCE TO RELATED APPLICATIONS

This application claims benefit of the filing dates of Chinese Patent Application No. 201711341677.1 filed on Dec. 14, 2017 and Chinese Patent Application No. 201711313230.3 filed on Dec. 12, 2017, the disclosure of which is hereby incorporated in its entirety by reference.

TECHNICAL FIELD

This disclosure relates to display technology, in particular, to a display panel and a display apparatus.

BACKGROUND

With the development of display screen technology, more and more display screens adopt a design with round corners, that is, four corners of a display screen are arc-shaped.

For a display screen with round corners, sub-pixels are arranged in rows and columns. Thus, the sub-pixels cannot fully fill the round corners of the display screen. As such, sawtooth-shaped notches exist, thereby forming sawteeth at the four corners of the display screen. Taking liquid crystal display (LCD) as an example, the method of solving the sawteeth on the four corners of the display screen of the LCD with the round corners in the related art is described as follows. The openings of the black matrixes which are located at four corners of the display screen are designed to be relatively small. Each sub-pixel corresponds to one opening. The smaller the area of the opening corresponding to the sub-pixel, the smaller the light transmittance of the sub-pixel. As such, the brightness of the four corners of the display screen is low. Therefore, the sawteeth at the four corners of the display screen are weakened.

However, when the above method is adopted to eliminate the sawteeth, the distance among the sub-pixels at the four corners of the display screen increases. As such, the distance among the sub-pixels of colors red (R), green (G), blue (B) in the same pixel is so large that what a user sees is not just one point, but three independent points. Meanwhile, a user can obviously notice dark dots caused by the black matrixes between the sub-pixels. Therefore, the bright dark dots distributed at intervals can be seen on the display screen.

BRIEF SUMMARY

Accordingly, one example of the present disclosure is a display panel. The display panel may include a first light shielding layer in a display region and a second light shielding layer in the display region. The first light shielding layer may include a plurality of first openings, and the second light shielding layer may include a plurality of second openings. The display region may include a middle display region and a periphery display region. An area of each of the plurality of first openings in the periphery display region may be smaller than an area of each of the plurality of the first openings in the middle display region. The area of each of the plurality of the first openings in the periphery display region may be smaller than an area of each of the plurality of the second openings in the periphery display region. Each of the plurality of second openings may have the same area.

Areas of the plurality of the first openings in the periphery display region may gradually decrease along a direction from a border of the middle display region and the periphery display region to an outer edge of the periphery display region. The areas of the plurality of the first openings along the direction from the border of the middle display region and the periphery display region to the outer edge of the periphery display region may decrease at a constant ratio or by a constant value.

In one embodiment, the display panel may be divided into a plurality of regions from a border of the middle display region and the periphery display region to an edge of the display panel, areas of the first openings in different regions may be different, and areas of the first openings in the same region may be the same.

The display panel may include an array substrate and a color film substrate, and the first light shielding layer may be on the array substrate, and the second light shielding layer may be on the color film substrate.

An orthographic projection of each of the plurality of the first openings on the second light shielding layer may be located inside one of the plurality of the second openings. In one embodiment, a center of an orthographic projection of each of the plurality of the first openings on the second light shielding layer coincides with a center of the one of the plurality of second openings.

The first light shielding layer may be made of a non-transparent metal. Material of the first light shielding layer may be the same as material of electrodes in the display panel. In one embodiment, the first light shielding layer is made of molybdenum. The second light shielding layer may be a black matrix layer. Each of the second openings in the black matrix layer may be filled with a color film layer. The color film layer may be a red color film layer, a green color film layer, or a blue color film layer. A shape of each of the plurality of the first openings may be the same as a shape of each of the plurality of the second openings. The shape of each of the plurality of the first openings may be rectangular. A thickness of the first light shielding layer may range from approximately 400 Å to approximately 600 Å. The display panel may be a LCD display panel.

Another example of the present disclosure is a display apparatus. The display apparatus may include the display panel according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the are apparent from the following detailed description taken in conjunction with the accompanying drawings in which:

DETAILED DESCRIPTION

Figure 1A:
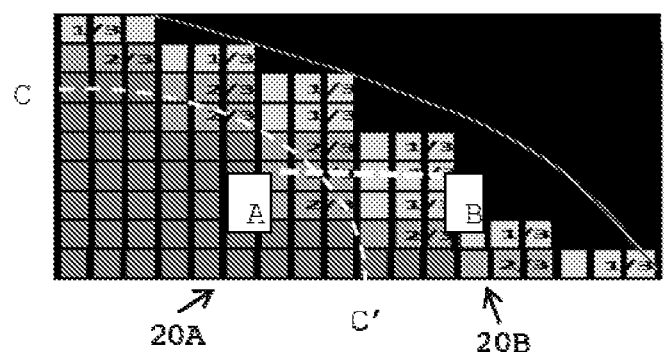
FIG. 1A is a schematic diagram of a corner of a display panel according to some embodiments of the present disclosure

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-3. When referring to the figures, like structures and elements shown throughout are indicated with like reference numerals.

In the description of the present disclosure, the meaning of "plural" is two or more unless otherwise in some embodiments defined.

In the description of the specification, references made to the terms "one embodiments," "some example embodiments," and "exemplary embodiments," "example," and "specific example," or "some examples" and the like are intended to refer that specific features and structures, materials or characteristics described in connection with the embodiments or example that are included in at least one embodiment or example of the present disclosure. The schematic expression of the terms does not necessarily refer to the same embodiment or example. Moreover, the specific features, structures, materials or characteristics described may be included in any suitable manner in any one or more embodiments or examples.

A numerical range modified by "approximately" herein means that the upper and lower limits of the numerical range can vary by 10% thereof. A number modified by "approximately" herein means that the number can vary by 10% thereof.

A display panel is provided according to some embodiments of the present disclosure. The display panel has a display region including a middle display region and an periphery display region; a first light shielding layer located in the display region and including a plurality of first openings arranged in an array mode; a second light shielding layer arranged in the display region and above the first light shielding layer. The second light shielding layer is provided with a plurality of second openings corresponding to the plurality of first openings. The area of the first opening in the periphery display region is smaller than that of the first opening in the middle display region. The area of the first opening in the periphery display region is smaller than that of the second opening in the periphery display region.

By controlling the areas of the first openings in the periphery display region of the display panel to be respectively smaller than the areas of the first openings in the middle display region of the display panel, and the areas of the first openings in the periphery display region to be respectively smaller than the areas of the second openings in the periphery display region, the amount of light emitted by each of the sub-pixels at the periphery of the panel is smaller than the amount of light emitted by each of the sub-pixels in the middle of the panel. Furthermore, the areas of the first openings in the periphery display region are respectively smaller than the areas of the second openings in the periphery display region. As such, while the size of each of the second openings of the second light shielding layer is the same (that is, the area of each of the second openings of the second light shielding layer is not changed), the existing problem of sawteeth at the four corners of the display panel having round corners is solved. In addition, since the area of each of the second openings of the second light shielding layer is not changed, the distance among the sub-pixels do not increase, thereby avoiding the phenomenon of bright dark dots.

In some embodiments, the display panel is a liquid crystal display panel. Taking the first substrate being an array substrate, and the second substrate being a color film substrate as an example, the first light shielding layer can be arranged on the array substrate, and the second light shielding layer can be arranged on the color film substrate. In one embodiment, the second light shielding layer is a black matrix layer.

In some embodiments, the display panel is an organic light emitting diode display panel or other type of display panel. Taking the organic light emitting diode display panel as an example, both the first light shielding layer and the second light shielding layer can be arranged above the light emitting unit (particularly an organic light-emitting layer) to control the amount of light emitted.

For an organic light emitting diode display panel with a color film substrate, the second light shielding layer may also be a black matrix layer. In the display panel with a black matrix layer, since the structure of the black matrix layer fulfills requirements of the disclosure for the second light shielding layer, the structure of the black matrix layer does not need to be changed.

The structure of the first light shielding layer and the structure of the second light shielding layer are described in detail below by taking the liquid crystal display panel as an example.

Figure 1B:
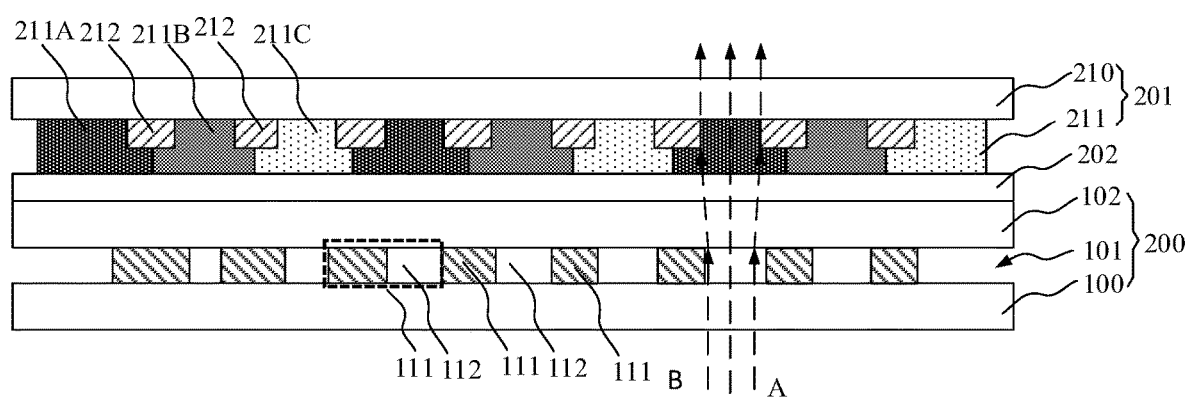
FIG. 1B is a schematic diagram of a display panel along line AB in FIG. 1A according to some embodiments of the present disclosure.

FIG. 1A is a schematic diagram of a corner of a display panel according to some embodiments of the present disclosure. As shown in FIG. 1A, the display panel includes a middle display region 20A and a peripheral display region 20B. The middle display region includes the area from the center of the display panel to the border CC' of the middle display region and the peripheral display region. The peripheral display region includes the area from the border CC' of the middle display region and the peripheral display region to the edges of the display panel. FIG. 1B is a schematic cross-sectional diagram of a display panel along line AB in FIG. 1A according to some embodiments of the present disclosure. The line AB crosses the border of the middle display region 20A and the peripheral display region 20B. As shown in FIG. 1B, the display panel includes an array substrate 200, a color film substrate 201, and a liquid crystal layer 202 arranged between the array substrate 200 and the color film substrate 201. The array substrate includes a base substrate 100 and a light shielding layer 101 arranged on the base substrate 100. The color film substrate includes a black matrix layer. The black matrix layer includes a plurality of black matrixes 212. The light shielding layer 101 is the first light shielding layer. The black matrix layer is the second light shielding layer.

Figure 2A:
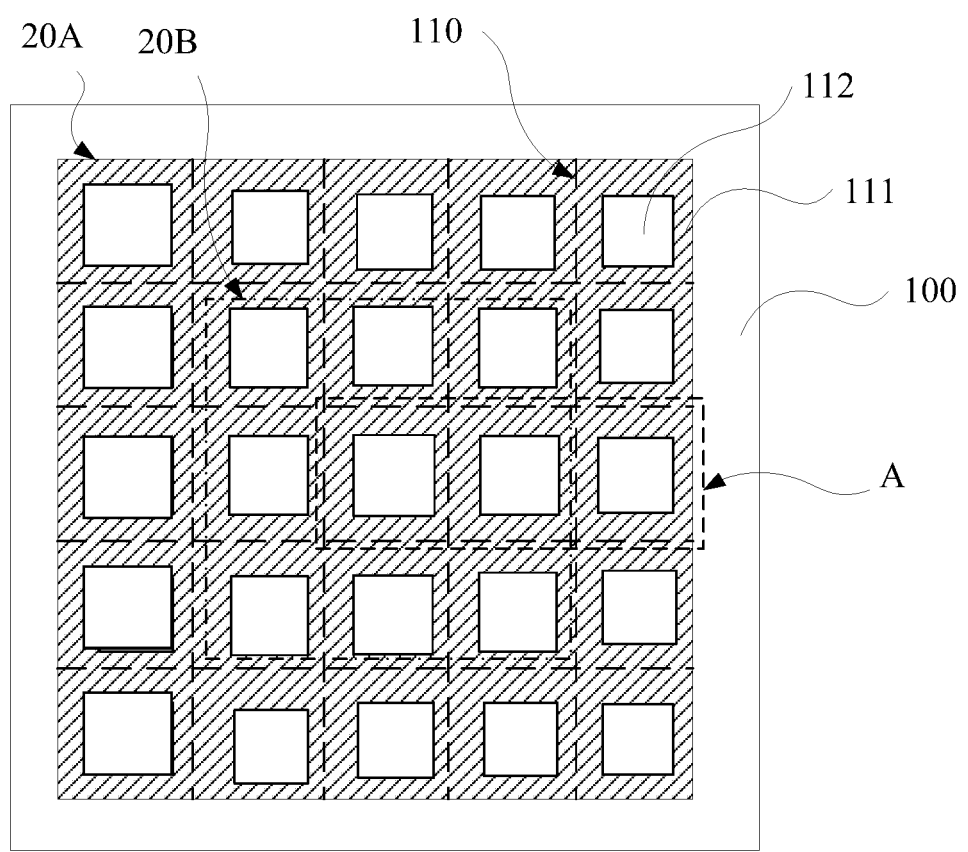
FIG. 2A is a schematic diagram of a first light shielding layer according to some embodiments of the present disclosure.

FIG. 2A is a top view of the light shielding layer 101 in the display panel along line AB in FIG. 1A according to some embodiments of the present disclosure. As shown in FIG. 2A, the display panel includes a display region. The display region has a plurality of sub-pixel regions 110 arranged in an array (the regions defined by dotted lines in FIG. 2A).

As shown in FIG. 1 and FIG. 2A, the light shielding layer 101 includes a plurality of light shielding units 111 which are arranged in the plurality of sub-pixel regions 110 respectively. Each of the light shielding units 111 includes a first opening 112.

Figure 3:
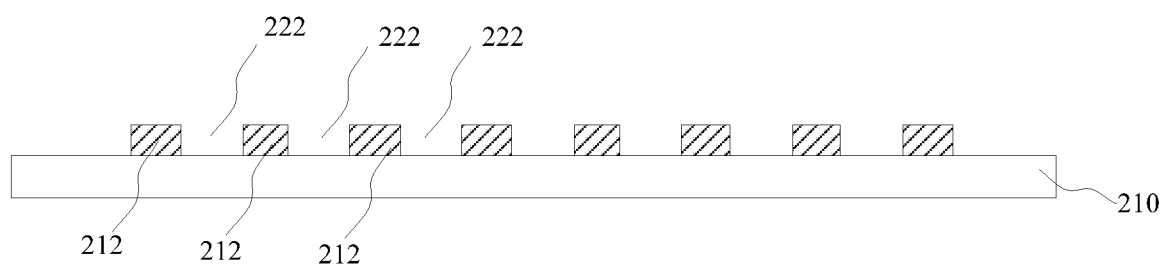
FIG. 3 is a schematic diagram of a second light shielding layer according to some embodiments of the present disclosure.

FIG. 3 is a detailed structure diagram of the black matrix layer in the display panel shown in FIG. 1. The black matrix layer includes a plurality of second openings 222 which are arranged corresponding to the plurality of sub-pixel regions 110.

The display region includes a middle display region 20A and a periphery display region 20B. The area of each of the first openings 112 in the periphery display region 20B of the display panel is smaller than the area of each of the first openings 112 in the middle display region 20A of the display panel. The area of each of the second openings 222 is equal. The area of each of the first openings 112 located in the periphery display region 20B of the display panel is smaller than the area of the second opening 222 located in the periphery display region 20B of the display panel. The periphery display region 20B is the periphery portion of the display panel, as shown in FIG. 1A. The shape of the periphery display region 20B may have a frame structure, surrounding the middle display region 20A of the display panel.

Figure 2B:
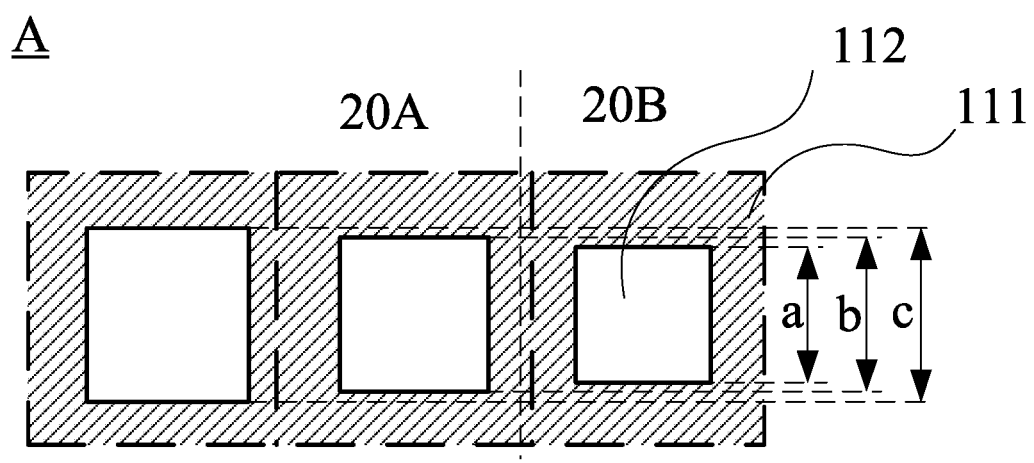
FIG. 2B is a partial enlarged schematic view of the region A of FIG. 2A.

FIG. 2B is a partial enlarged schematic view of region A of FIG. 2A. As shown in FIG. 2B, the area of the first opening 112 in the middle display region 20A of the display panel is larger than the area of the first openings 112 in the periphery display region 20B of the display panel. As shown in FIG. 2B, the middle display region 20A is on the left side of the vertical dotted line, and the periphery display region 20B is on the right side of the vertical dotted line.

FIG. 2A and FIG. 2B are schematic diagrams showing the light shielding unit 111 within each of the sub-pixel regions 110. The position and the size of the first opening 112, and the division of the middle display region and the periphery display region are only schematic. They can be designed according to actual situations. In the embodiments shown in FIGS. 2A and 2B, each of the light shielding units 111 is connected with each other. In some embodiments, the light shielding unit 111 in each sub-pixel region 110 can be independently arranged. For example, there are gaps between the light shielding units 111. It is not limited herein.

In an LCD with low temperature poly-silicon (LTPS) technology, since the poly-silicon is more sensitive to backlight, the poly-silicon in the active layer can be shielded by adding a light shielding layer on the substrate, thereby preventing the backlight from influencing the performance of the active layer. In related arts, the shape and the size of each of the light shielding units in different sub-pixel regions 110 of the same LCD are identical. However, in the embodiments of the present disclosure, the problems of sawtooth and bright dark dots are solved by changing the shape and the size of each of the light shielding units in the sub-pixel regions 110 at different positions of the LCD. In some embodiments, the transmittance of the openings is between approximately 30% and approximately 100%.

In addition, the design scheme of the light shielding layer provided by the embodiments of the present disclosure can also be applied to other TFT-LCDs that need to be shielded, or even to other displays needed to be shielded.

By controlling the area of the first opening 112 of the light shielding unit 111 in the periphery display region of the display panel to be smaller than the area of the first opening 112 of the light shielding unit 111 located in the middle display region of the display panel, the amount of light emitted by the sub-pixel on the periphery of the panel is smaller than the amount of light emitted by the sub-pixel in the middle of the panel. As such, while the size of the second opening 222 of the black matrix 212 in each of the sub-pixel regions is maintained the same (that is, the area of the second opening 222 of each of the black matrixes is not changed), the problem existed in the round corners design, that is, the problem of sawtooth at the four corners of the display panel of the LCD is solved. Meanwhile, the areas of the second openings 222 of the black matrixes 212 are not changed. As such, the distance among the sub-pixels does not increase, thereby avoiding the phenomenon of bright dark dots.

As shown in FIG. 1B, the array substrate 200 further includes other film layers 102 disposed on the light shielding layer 101 according to some embodiments of the present disclosure. In some embodiments, the other film layers 102 include a buffer layer, a gate electrode, a gate electrode insulating layer, an active layer, source and drain electrodes, a protective layer, a pixel electrode layer or the like stacked on the light shielding layer 101. In some embodiments, the active layer is a low-temperature poly-silicon active layer. The gate electrode, the gate electrode insulating layer, the active layer, and the source and drain electrodes constitute a structure of a thin film transistor. The structure is illustrated by a structure of a bottom gate type thin film transistor as an example. However, the thin film transistor structure in the array substrate can also be a top gate type, the detail of which is not repeated herein.

In some embodiments, the base substrate 100 is a transparent substrate, such as a glass substrate, a silicon substrate, a plastic substrate or the like.

In some embodiments, the light shielding layer 101 is made of a material such as metal, metal oxide or other materials with a light shielding function. In one embodiment, the light shielding layer 101 is an opaque metal layer. Adopting the opaque metal layer as the light shielding layer 101 can not only shield backlight, but also shield the influence of the electric signals on the thin-film transistors in the array substrate.

Besides the base substrate 100 and the light shielding layer 101, other film layers such as a buffer layer, a gate electrode, a gate electrode insulating layer, an active layer, and source and drain electrodes, a protective layer, a pixel electrode layer and the like are arranged on the light shielding layer in a stacked mode according to some embodiments of the present disclosure. The active layer is a low-temperature poly-silicon active layer. The gate electrode, the gate electrode insulating layer, the active layer and the source and drain electrodes constitute a thin film transistor structure. The structure is illustrated by a structure of a bottom gate type thin film transistor as an example. In some other embodiments, the thin film transistor structure in the array substrate can also be of a top gate type thin film transistor structure, and the description thereof is not repeated here.

Further, the material for the light shielding layer 101 can be the same as that of the gate electrode or the source and drain electrodes in the array substrate. Using the same material for the light shielding layer and the gate electrode or the source/drain electrodes facilitates the fabrication of the whole array substrate. In some other embodiments, for example, in an organic light emitting diode display panel, the material for the light shielding layer 101 can also be the same as the material for the cathode, the anode or the like. In conclusion, the material for the first light shielding layer can be the same as the material for the electrodes in the display panel.

In some embodiments, the light shielding layer 101 is made of molybdenum. Adopting the molybdenum for the light shielding layer 101 can shield both the electric signals and the light. Meanwhile, the molybdenum is often used as material of electrode layers such as gate electrodes. As such, the light shielding layer can use the same material as the electrode layer.

In some embodiments, a method of fabricating the light shielding layer 101 is described below by taking a metal material as an example. During the process of fabricating the light shielding layer 101, a metal layer is first deposited on a base substrate. Then, a light shielding layer including first openings 112a is formed by a patterning process on the metal layer. In one embodiment, the metal layer can be deposited by a sputtering process. The patterning process may specifically include the following steps: coating photoresist on the metal layer, processing the photoresist by exposure and developing to form a photoresist patterning mask, and etching the metal layer exposed by the photoresist patterning mask. As such, the first openings 112 are formed on the metal layer. Finally, the photoresist patterning mask is removed.

As shown in FIG. 1B, the color film substrate 201 further includes a substrate 210 and a color film layer 211 according to some embodiments of the present disclosure. The second openings 222 in the black matrixes 212 are filled with the color film layer 211. As such, when a light passes through the second opening 222 filled with the color film layer 211, a color light is emitted by the sub-pixel.

In some embodiments, the color film layer 211 includes a plurality of red color films 211A, a plurality of green color films 211B, and a plurality of blue color films 211C. The color film layer 211 may be made of a color resistance material.

In some embodiments, along the direction from the border of the middle display region 20A and the periphery display region 20B to the outer edge of the periphery display region 20B, the areas of the plurality of the first openings 112 gradually decrease. That is, on a connecting line from the border of the middle display region 20A and the periphery display region 20B to any point on the edge of the display panel, the areas of the first openings 112 of the light shielding units 111 in the sub-pixel regions 110 on the connecting line gradually decrease in the direction from the border of the middle display region 20A and the periphery display region 20B to the edge of the display panel. As shown in FIG. 2B, the areas of the first openings 112 of the light shielding units 111 gradually decrease in the direction from the border of the middle display region 20A and the periphery display region 20B to the edge of the display panel. As such, while the brightness of the backlight source and the deflection angle of the liquid crystals are maintained the same, the brightness from the border of the middle display region 20A and the periphery display region 20B to the four corners thereof gradually decreases so that the sawteeth at the four corners of the display panel are weakened. Furthermore, the abrupt discontinuity of brightness does not occur, and the normal display of the display panel is not influenced. In addition, it is necessary to ensure that the brightness difference between the center of the display panel and the edge of the display panel is small, e.g., not more than 5%, when brightness of the backlight source and the deflection angle of the liquid crystal are maintained the same. As such, a user does not obviously feel the brightness difference, thereby ensuring a normal display.

As shown in FIG. 1B, light A from the backlight source sequentially passes through the first openings 112 of the light shielding layer 101, the other film layers 102 of the array substrate, the liquid crystal layer 202, and then the second openings 222 of the black matrixes 212. Since the areas of the first openings 112 of the light shielding layer 101 gradually decrease in the direction from the border of the middle display region 20A and the periphery display region 20B to the outer edge of the periphery display region 20B, the amount of light passing through the light shielding layer 101 gradually decreases from the border of the middle display region 20A and the periphery display region 20B to the edge of the display panel. As such, the problem of sawteeth at the four corners of the display panel can be solved. Since the area of the second opening 222 of the black matrix 212 in each sub-pixel is the same, the distance between the sub-pixels viewed by the user is equal, thereby avoiding the problem of bright and dots.

After passing through the first openings 112 of the light shielding layer 101, the light then passes through the other film layers 102 and the liquid crystal layer 202. Since these film layers have a diffusion effect on the light, all parts of the second openings 222 of the black matrixes 212 have light passing through.

In some embodiments, that the areas of the first openings 112 gradually decrease can be provided according to the following embodiments. In one embodiment, on a connecting line from the border of the middle display region 20A and the periphery display region 20B to any point on the edge of the display panel, the areas of the first openings 112 of the light shielding units 111 in any two sub-pixel regions 110 are different, that is, they gradually decrease. In another embodiment, the periphery display region of the display panel is divided into a plurality of regions from the border of the middle display region 20A and the periphery display region 20B to the edge of the display panel. The shape of the region is rectangular or square. The areas of the first openings 112 in different regions are different. The areas of the first openings 112 in the same region are the same. That is, the areas of the first openings 112 decrease according to regions.

The degree that the areas of the first openings 112 decrease can be adjusted according to actual needs. In some embodiments, the areas of the first openings 112 can decrease at a constant ratio or by a constant value of difference or the like, thereby securing normal display of the liquid crystal display.

In some embodiments, the areas of the first openings 112 can also have other arrangement modes. For example, the areas of the first openings 112 in the middle display region of the display panel are the same. The areas of the first openings 112 in the periphery display region of the display panel are the same. The area of each of the first openings 112 in the middle display region is larger than the area of each of the first openings 112 in the periphery display region as mentioned above.

In some embodiments, the outer contour of the light shielding unit 111 can be regular or irregular, as long as the function of shielding of light and electric signals can be satisfied. In some embodiments, the light shielding unit 111 can have a rectangular frame. The first opening 112 is provided at the center of the rectangular frame. The light shielding unit 111 of this contour type can meet the requirements of shielding electric signal and light at the same time. Furthermore it is also convenient to design and fabricate the light shielding unit 111 of this contour type.

In some embodiments, the shape of the first opening 112 may have a regular or irregular pattern, as long as all the first openings 112 of the display panel can control the amount of light emitted to change according to a preset trend. In some embodiments, the shape of each of the first openings 112 is rectangular. In some embodiments, the shape of each of the first openings 112 of the light-shielding units 111 is the same as that of each of the second openings 222 of the black matrixes 212, thereby facilitating designing positional relation between the first openings 112 of the light-shielding units 111 and the second openings 222 of the black matrixes 212.

In some embodiments, when the shape of the first opening 112 is a rectangular, that the area of the first opening decreases specifically means that the length of the side of the rectangle decreases. For example, as shown in FIG. 2B, the lengths of the sides c, b and a of three first openings 112 gradually decrease.

In some embodiments, the projections of the first openings 112 of the light-shielding units 111 in the periphery display region 20B on the base substrate 100 are respectively inside the projections of the second openings 222 of the black matrixes 212 on the base substrate 100. That is, the projections of the first openings 112 in the periphery display region 20B on the second light shielding layer (black matrix layer) are respectively located inside the corresponding second openings 222. That is, in a direction perpendicular to the base substrate 100, the first openings 112 in the periphery display region 20b are respectively right opposite to the second openings 222 in the periphery display region 20b.

Further, the projection of the first opening 112 in each of the sub-pixel regions on the base substrate 100 is located inside the projection of the second opening 222 on the base substrate 100. That is, the projection of each of the first openings 112 on the second light shielding layer (black matrix layer) is located inside the corresponding second opening 222. In the embodiments, the area of the first opening 112 in a sub-pixel region in the middle display region 20A is smaller than the area of the second opening 222. The first openings 112 of the light-shielding units 111 are respectively inside the projections of the corresponding second openings 222 of the black matrixes 212. As such, the areas of the first openings 112 of the light shielding units 111 can completely control the light transmittance, thereby solving the problem of sawteeth. In some embodiments, the area of the first opening 112 in a sub-pixel region in the middle display region 20A can also be larger than or equal to the area of the second opening 222, thereby solving the problem of sawteeth and the bright dark dots.

In some embodiments, the centers of the projections of the first opening 112 on the base substrate 100 coincide with the centers of the projections of the second openings 222 on the base substrate 100 respectively. That is, the center of the projection of each of the first openings 112 on the second light shielding layer (the black matrix layer) coincides with the center of the corresponding second opening 222. In some embodiments, the second openings 222 of the black matrixes 212 are uniformly arranged, for example, in an array mode. Furthermore, the areas of the first openings 112 of the light-shielding units 111 change. The center of the second opening 222 of the black matrix 212 of each sub-pixel region coincides with the center of the first opening 122 of the light-shielding unit 111. As such, the area of the opening of the light shielding layer 101 of each of the sub-pixels is uniformly changed from the center to the edge of the display panel.

In some embodiments, the thickness of the light shielding layer 101 ranges from approximately 400 Å to approximately 600 Å, preferably approximately 300 Å to approximately ×500 Å. As such, both electric signal shielding and light shielding are guaranteed.

A display apparatus is provided according to some embodiments of the present disclosure. The display apparatus includes a display panel according to one embodiment of the present disclosure, for example, as shown in FIG. 1B.

In some embodiments, the display apparatus can be a mobile phone, a tablet computer, a television, a display, a laptop, a digital photo frame, a navigator, other products or parts with display function.

In some embodiments of the present disclosure, the areas of the first openings of the light shielding units in the periphery display region of the display panel are controlled to be smaller than the areas of the first openings of the light shielding units in the middle display region of the display panel respectively. In addition, the areas of the first openings in the periphery display region is smaller than the areas of the second openings in the periphery display region respectively. As such, the amount of light emitted from each of the sub-pixels near the periphery of the panel is smaller than the amount of light emitted from each of the sub-pixels at the middle of the panel. While the area of the second opening of the second light shielding layer in each sub-pixel region is maintained the same (that is, the areas of the second openings of the second light shielding layer are not changed), the problem of sawteeth at the four corners of the display panel with round corners is solved. Meanwhile, since the areas of the second openings of the second light shielding layer are not changed, the distances among the sub-pixel do not increase, thereby avoiding the phenomenon of bright and dark dots.

The principles and the embodiments of the disclosures are set forth in the specification. The description of the embodiments of the present disclosure is only used to help understand the method of the present disclosure and the core idea thereof. Meanwhile, for a person of ordinary skill in the art, the disclosure relates to the scope of the disclosure, and the technical scheme is not limited to the specific combination of the technical features, and also should covered other technical schemes which are formed by combining the technical features or the equivalent features of the technical features without departing from the inventive concept. For example, technical scheme may be obtained by replacing the features described above as disclosed in this disclosure (but not limited to) with similar features.

What is claimed is:

1. A display panel, comprising:
   a first light shielding layer in a display region, the first light shielding layer comprising a plurality of first openings; and
   a second light shielding, layer in the display region, the second light shielding layer comprising a plurality of second openings;
   wherein the display region comprises a middle display region and a periphery display region;
   an area of each of the plurality of the first openings in the periphery display region is smaller than an area of each of the plurality of the first openings in the middle display region; and
   the area of each of the plurality of the first openings in the periphery display region is smaller than an area of each of the plurality of the second openings in the periphery display region.

2. The display panel according to claim 1, wherein each of the plurality of the second openings has the same area.

3. The display panel according to claim 1, wherein areas of the plurality of the first openings in the periphery display region gradually decrease along a direction from a border of the middle display region and the periphery display region to an outer edge of the periphery display region.

4. The display panel according to claim 3, wherein the areas of the plurality of the first openings along the direction from the border of the middle display region and the periphery display region to the outer edge of the periphery display region decrease at a constant ratio or by a constant value.

5. The display panel according to claim 1, wherein the display panel is divided into a plurality of regions from a border of the middle display region and the periphery display region to an edge of the display panel, areas of the first openings in different regions are different, and areas of the first openings in the same region are the same.

6. The display panel according to claim 1, wherein the display panel comprises an array substrate and a color film substrate, and the first light shielding layer is on the array substrate, and the second light shielding layer is on the color film substrate.

7. The display panel according to claim 1, wherein an orthographic projection of each of the plurality of the first openings on the second light shielding layer is located inside one of the plurality of the second openings.

8. The display panel according to claim 7, wherein a center of an orthographic projection of each of the plurality of the first openings on the second light shielding layer coincides with a center of the one of the plurality of second openings.

9. The display panel according to claim 1, wherein the first light shielding layer is made of a non-transparent metal.

10. The display panel according to claim 1, wherein material of the first light shielding layer is the same as material of electrodes in the display panel.

11. The display panel according to claim 9, wherein the first light shielding layer is made of molybdenum.

12. The display panel according to claim 1, wherein the second light shielding layer is a black matrix layer.

13. The display panel according to claim 12, wherein each of the second openings in the black matrix layer is filled with a color film layer.

14. The display panel according to claim 13, wherein the color film layer is a red color film layer, a green color film layer, or a blue color film layer.

15. The display panel according to claim 1, wherein a shape of each of the plurality of the first openings is the same as a shape of each of the plurality of the second openings.

16. The display panel according to claim 15, wherein the shape of each of the plurality of the first openings is rectangular.

17. The display panel according to claim 1, wherein a thickness of the first light shielding layer ranges from approximately 400 Å to approximately 600 Å.

18. The display panel according to claim 1, wherein the display panel is a LCD display panel.

19. A display apparatus comprising the display panel according to claim 1.

* * * * *